(12) United States Patent
Szumer

(10) Patent No.: US 6,418,634 B1
(45) Date of Patent: Jul. 16, 2002

(54) SPIRIT LEVEL WITH HAND GRIPS

(75) Inventor: Emanuel H. Szumer, Bikat Beit Hakerem (IL)

(73) Assignee: Kapro Industries Limited, Hakerem (IL)

( * ) Notice: Subject to any disclaimer, the term of this patent is extended or adjusted under 35 U.S.C. 154(b) by 0 days.

(21) Appl. No.: 09/623,664

(22) PCT Filed: Mar. 1, 1999

(86) PCT No.: PCT/IL99/00118

§ 371 (c)(1),
(2), (4) Date: Nov. 7, 2000

(87) PCT Pub. No.: WO99/45341

PCT Pub. Date: Sep. 10, 1999

(30) Foreign Application Priority Data

Mar. 6, 1998 (IL) ................................................. 123586

(51) Int. Cl.⁷ ................................................. G01C 9/00
(52) U.S. Cl. ....................................................... 33/365
(58) Field of Search ......................... 33/365, 451, 377, 33/379, 381, 382, 383, 384

(56) References Cited

U.S. PATENT DOCUMENTS

| | | |
|---|---|---|
| 1,034,049 A | 7/1912 | Wild |
| 2,373,249 A | 4/1945 | Lurcott, Jr. |
| 2,427,256 A | 9/1947 | Butscher |
| 3,368,287 A | 2/1968 | Ault |
| 3,694,090 A | 9/1972 | Ohyama |
| 3,889,353 A * | 6/1975 | Provi ........................ 33/381 |
| 3,921,306 A * | 11/1975 | Provi ........................ 33/379 |
| 4,647,767 A | 3/1987 | Jubinski |
| 5,020,232 A | 6/1991 | Whiteford .................. 33/348.2 |
| 5,101,570 A | 4/1992 | Shimura |
| 5,103,569 A | 4/1992 | Leatherwood ............... 33/379 |
| 5,207,004 A | 5/1993 | Gruetzmacher ............. 33/379 |
| 5,272,816 A | 12/1993 | Fujiwara .................... 33/379 |
| 5,361,503 A | 11/1994 | Anderson .................. 33/348.2 |
| 5,414,937 A | 5/1995 | Denley ....................... 33/379 |
| 5,467,532 A | 11/1995 | Ames .......................... 33/334 |
| 5,588,217 A | 12/1996 | Lindner et al. ............. 33/379 |
| 5,746,004 A * | 5/1998 | Wertheim ................... 33/769 |

FOREIGN PATENT DOCUMENTS

| | | | |
|---|---|---|---|
| EP | 0 239 030 | 9/1987 | |
| GB | 2 080 529 | 2/1982 | |
| GB | 2223586 | * 4/1990 | .................. 33/760 |

* cited by examiner

Primary Examiner—Christopher W. Fulton
(74) Attorney, Agent, or Firm—Ladas & Parry

(57) ABSTRACT

A spirit level including a body having a level face for setting a surface and a non-setting face extending away from said level face, at least one bubble vial mounted in the body, and at least one hand-grip aperture, defining an inner perimeter, formed in the body and which extends through the non-setting face, characterized by the perimeter of the at least one hand-grip aperture being at least partially coated with an elastomer.

3 Claims, 1 Drawing Sheet

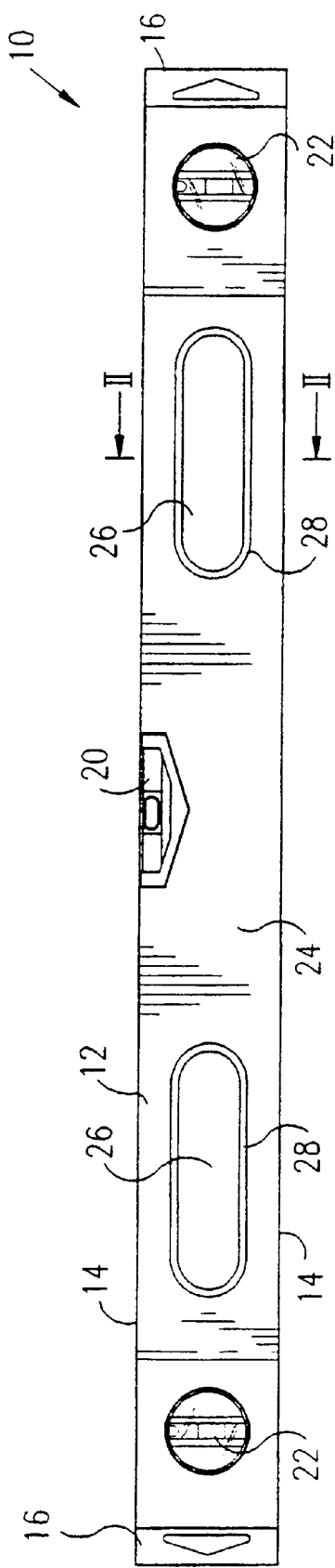
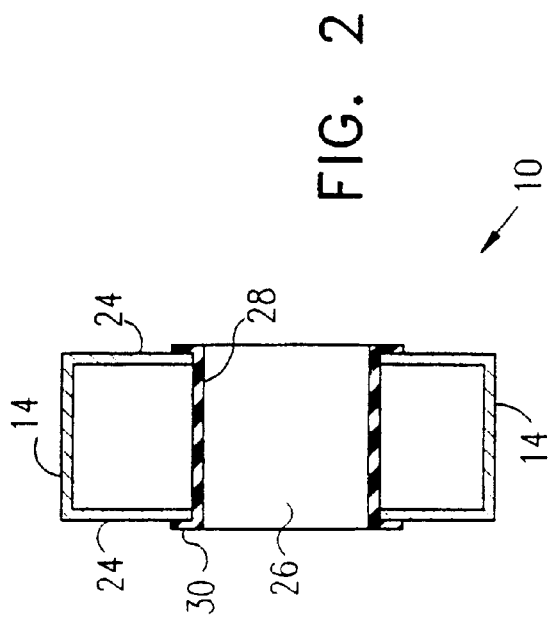

SPIRIT LEVEL WITH HAND GRIPS

FIELD OF THE INVENTION

The present invention relates to spirit levels and particularly to a spirit level with hand grips.

BACKGROUND OF THE INVENTION

Spirit levels, also called bubble levels, are well known instruments used for setting horizontal or vertical surfaces. The level includes a sealed vial containing an air bubble floating in a liquid. The particular surface is considered horizontal or vertical when the air bubble rests between predetermined graduated marks in the vial.

Spirit levels with hand grips or handles are known. Typically elongate holes are formed in the level with sufficient room to insert a user's fingers therein or therethrough in order to grasp the level.

SUMMARY OF THE INVENTION

The present invention seeks to provide an improved spirit level including rubberized hand grips. Preferably cutouts are formed in the level and coated with an elastomer. The rubberized hand grips provide a better gripping surface than the uncoated hand grips of the prior art, and also help thermally insulate a user's hand from the cold body of the level when working in cold environments. Most preferably, the elastomeric coating protrudes from a non-setting face of the level so that when the level is placed against a surface to be set, the elastomeric coating provides a high-friction, non-slip interface between the level and the surface to be set. The level may be of hollow box construction or I-beam construction.

There is thus provided in accordance with a preferred embodiment of the present invention a spirit level including a body having a level face for setting a surface and a non-setting face extending away from the level face, and at least one bubble vial mounted in the body, wherein at least one hand-grip aperture, defining an inner perimeter, is formed in the body and extends through the non-setting face, and wherein the perimeter of the at least one hand-grip aperture is at least partially coated with an elastomer. Preferably the inner perimeter of the hand-grip aperture is fully coated with the elastomer.

In accordance with a preferred embodiment of the present invention the elastomer protrudes from the non-setting face.

Further in accordance with a preferred embodiment of the present invention the elastomer has a rim portion extending over the non-setting face.

Still further in accordance with a preferred embodiment of the present invention the level includes a pair of opposing non-setting faces and the at least one hand-grip aperture extends through both the non-setting faces.

BRIEF DESCRIPTION OF THE DRAWINGS

The present invention will be understood and appreciated more fully from the following detailed description, taken in conjunction with the drawings in which:

FIG. 1 is a simplified pictorial illustration of a spirit level constructed and operative in accordance with a preferred embodiment of the present invention; and FIG. 2 is a simplified, enlarged sectional illustration of the spirit level of FIG. 1 taken along lines II—II in FIG. 1.

DETAILED DESCRIPTION OF A PREFERRED EMBODIMENT

Reference is now made to FIGS. 1 and 2 which illustrate a spirit level 10 constructed and operative in accordance with a preferred embodiment of the present invention. Spirit level 10 preferably includes a body 12 having one or more level faces 14 for setting a surface (not shown). Body 12 is preferably made of a mechanically stable and durable metal alloy, as is well known in the art. Level face 14 typically has highly accurate flatness and smoothness. End caps 16, typically made of plastic, may be fixed to ends of body 12, as is known in the art. Spirit level 10 is illustrated as having a hollow box construction, but it is appreciated that an I-bean construction may be employed as well.

Spirit level 10 preferably includes one or more bubble vials 20 mounted in body 12 for setting a vertical surface and one or more bubble vials 22 for setting a horizontal surface.

Body 12 also has a non-setting face 24 extending away from level face 14. Typically non-setting face 24 is generally perpendicular to level face 14. In the illustrated hollow box construction, two opposing non-setting faces 24 are provided. In an I-beam construction, generally only one non-setting face 24 is provided. One or more hand-grip apertures 26, each defining an inner perimeter, are formed in body 12 and extend through non-setting face 24. The inner perimeter of hand-grip aperture 26 is at least partially coated with an elastomer 28. Preferably the inner perimeter of hand-grip aperture 26 is fully coated with elastomer 28. Elastomer 28 may be any suitable elastomeric material, such as rubber, neoprene, isoprene, polybutadiene, nitrile, or polyurethane, for example.

Elastomer 28 may be generally flush with non-setting face 24. Most preferably elastomer 28 protrudes from non-setting face 24 and has a rim portion 30 which extends over non-setting face 24. In this manner, when spirit level 10 is placed against a surface to be set, elastomer 28 provides a high-friction, non-slip interface between the level and the surface to be set.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A spirit level (10) comprising:
   a body (12) having a level face (14) for setting a surface and an outermost non-setting face (24) extending away from said level face (14), at least one bubble vial (20, 22) mounted in the body (12), and at least one hand-grip aperture (26), defining an inner perimeter, formed in said body (12) and which extends through said non-setting face (24),
   characterized by the perimeter of said at least one hand-grip aperture (26) being at least partially coated with an elastomer (28), wherein said elastomer (28) protrudes from said outermost non-setting face (24), and wherein said elastomer (28) comprises a rim portion (30) extending over said outermost non-setting face (24) providing a high-friction, non-slip interface.

2. A spirit level (10) according to claim 1 wherein the perimeter of said hand-grip aperture (26) is fully coated with said elastomer (28).

3. A spirit level (10) according to claim 1 wherein said level comprises a pair of opposing outermost non-setting faces (24) extending from said level face (14) and said at least one hand-grip aperture (26) extends through both said outermost non-setting faces (24).

* * * * *